(12) United States Patent
Varekamp et al.

(10) Patent No.: US 10,546,421 B2
(45) Date of Patent: Jan. 28, 2020

(54) GENERATION OF TRIANGLE MESH FOR A THREE DIMENSIONAL IMAGE

(71) Applicant: KONINKLIJKE PHILIPS N.V., Eindhoven (NL)

(72) Inventors: Christiaan Varekamp, Eindhoven (NL); Patrick Luc Els Vandewalle, Eindhoven (NL); Bart Kroon, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 15/761,456

(22) PCT Filed: Sep. 22, 2016

(86) PCT No.: PCT/EP2016/072485
§ 371 (c)(1),
(2) Date: Mar. 20, 2018

(87) PCT Pub. No.: WO2017/050858
PCT Pub. Date: Mar. 30, 2017

(65) Prior Publication Data
US 2019/0057545 A1    Feb. 21, 2019

(30) Foreign Application Priority Data

Sep. 23, 2015 (EP) .................................... 15186439

(51) Int. Cl.
*G06T 17/20* (2006.01)
*G06T 17/00* (2006.01)

(52) U.S. Cl.
CPC ............ *G06T 17/20* (2013.01); *G06T 17/005* (2013.01)

(58) Field of Classification Search
CPC ................................................ G06T 17/00–30
See application file for complete search history.

(56) References Cited

U.S. PATENT DOCUMENTS

| 5,345,490 | A | 9/1994 | Finnigan et al. |
| 5,448,686 | A | 9/1995 | Borrel et al. |
| 2007/0024620 | A1 | 2/2007 | Muller-Fischer |
| 2013/0106852 | A1 | 5/2013 | Woodhouse et al. |

(Continued)

OTHER PUBLICATIONS

Devillers, Olivier, and P-M. Gandoin. "Geometric compression for interactive transmission." Visualization 2000. Proceedings. IEEE, 2000. (Year: 2000).*

(Continued)

*Primary Examiner* — Daniel F Hajnik

(57) ABSTRACT

An apparatus is arranged to generate a triangle mesh for a three dimensional image. The apparatus includes a depth map source (101) which provides a depth map and a tree generator (105) generates a k-D tree from the depth map. The k-D tree representing a hierarchical arrangement of regions of the depth map satisfying a requirement that a depth variation measure for undivided regions is below a threshold. A triangle mesh generator (107) positions an internal vertex within each region of the k-D tree. The triangle mesh is then generated by forming sides of triangles of the triangle mesh as lines between internal vertices of neighboring regions. The approach may generate an improved triangle mesh that is suitable for many 3D video processing algorithms.

20 Claims, 8 Drawing Sheets

(56) References Cited

U.S. PATENT DOCUMENTS

| | | | | |
|---|---|---|---|---|
| 2015/0304665 | A1* | 10/2015 | Hannuksela | H04N 19/70 375/240.02 |
| 2016/0134891 | A1* | 5/2016 | Lee | H04N 19/597 375/240.08 |

OTHER PUBLICATIONS

Chai, Bing-Bing, et al. "Depth map compression for real-time view-based rendering." Pattern Recognition Letters 25.7 (2004): 755-766. (Year: 2004).*

Akenine-Moller, Tomas, Eric Haines, and Naty Hoffman. "Real-Time Rendering." (2008). 3rd ed., pp. 650-656. (Year: 2008).*

High Efficiency Video Coding (HEVC(H.265) Standard Apr. 2013.

M. W. Bern and P. E. Plassmann, Mesh Generation, Handbook of Computational Geometry, edited by J.R. Sack and J. Urrutia, Elsevier Science, 1999 (first published as Technical Note Pennsylvania State University, 1997).

K. Ho-Le, Finite element mesh generation methods: a review and classification, Computer Aided Design, vol. 20, No. 1, pp. 27-38, 1988.

http://www.robertschneiders.de/meshgeneration//software.html. downloaded Mar. 14, 2018.

http://meshlab.sourceforge.net/. downloaded Mar. 14, 2018.

M. A. Yerry and S. A. Shepherd, "A Modified Quadtree Approach to Finite Element Mesh Generation" IEEE Computer Graphics and Applications, vol. 3, No. 1, pp. 39-46, Jan. 1983.

P. J. Frey and L. Marechal. "Fast adaptive quadtree mesh generation." In 7th International Meshing Roundtable, pp. 211-224. 1998.

P. Reddy et al., Quadtree Based Triangular Mesh Generation for Finite Element Analysis of Heterogeneous Spatial Data, ASEA Annual International Meeting, Jul. 2001.

https:/www.opengl.org/about Website printed Mar. 14, 2018.

https://msdn.microsoft.com/library/windows/apps/hh452744 downloaded Mar. 14, 2018.

https://www.khronos.org/opengl/wiki/Rendering_Pipeline_Overview downloaded Mar. 14, 2018.

https://sonnati.wordpress.com/2014/06/20/h265-part-i-technical-overview/ downloaded Mar. 14, 2018.

http://en.wikipedia.org/wiki/HTML5 downloaded Mar. 20, 2018.

http://en.wikipedia.org/wiki/WebGL downloaded Mar. 20, 2018.

http://en.wikipedia.org/wiki/OpenGL_Shading_Language downloaded Mar. 20, 2018.

https: www.hhi.fraunhofer.de downloaded Mar. 20, 2018.

* cited by examiner

GENERATION OF TRIANGLE MESH FOR A THREE DIMENSIONAL IMAGE

CROSS-REFERENCE TO PRIOR APPLICATIONS

This application is the U.S. National Phase application under 35 U.S.C. § 371 of International Application No. PCT/EP2016/072485, filed on Sep. 22, 2016, which claims the benefit of EP Patent Application No. EP 15186439.4, filed on Sep. 23, 2015. These applications are hereby incorporated by reference herein.

FIELD OF THE INVENTION

The invention relates to generation of a triangle mesh for a three dimensional image, and in particular, but not exclusively, to generation of a triangle mesh for a three dimensional image represented by a two dimensional image and a depth map.

BACKGROUND OF THE INVENTION

Three dimensional (3D) displays add a third dimension to the viewing experience by providing a viewer's two eyes with different views of the scene being watched. This can be achieved by having the user wear glasses to separate two views that are displayed. However, as this may be considered inconvenient to the user, it is in many scenarios preferred to use autostereoscopic displays that use means at the display (such as lenticular lenses, or barriers) to separate views, and to send them in different directions where they individually may reach the user's eyes. For stereo displays, two views are required whereas autostereoscopic displays typically require more views (such as e.g. nine views).

In order to implement 3D functionality, it is important that an effective representation and processing of three dimensional information can be employed. One widely used approach is to represent the three dimensional information by three dimensional objects which can be processed and manipulated by suitable algorithms.

A particularly effective approach in many scenarios is to represent image objects by a polygon mesh where a set of polygons are connected by their common edges or corners, which are given by three dimensional positions. The combined three dimensional polygon mesh accordingly provides an effective model of three dimensional objects, including possibly a three dimensional description of an entire image. The polygon mesh is often a triangle mesh formed by triangles having common corners given in 3D space.

In such representations, the polygon mesh is used to provide information of the three dimensional geometry of the object whereas the texture is typically provided as a separate data structure. Specifically, the texture is often provided as a separate two dimensional map which by the processing algorithm can be overlaid on the three dimensional geometry.

The use of triangle meshes is particularly suitable for processing and manipulation by computer graphics algorithms, and many efficient software and hardware solutions have been developed and are available in the market. A substantial computational efficiency is in many of the systems achieved by the algorithm processing the individual vertices commonly for a plurality of polygons rather than processing each polygon separately. For example, for a typical triangle mesh, the individual vertex is often common to several (often 3-8) triangles. The processing of a single vertex may accordingly be applicable to a relatively high number of triangles thereby substantially reducing the number of points in an image or other object that is being processed.

As a specific example, many current Systems on Chip (SoCs) contain a Graphics Processing Unit (GPU) which is highly optimized for processing of 3D graphics. For instance, the processing of 3D object geometry and 3D object texture is done using two largely separate paths in the so called OpenGL rendering pipeline (or in many other APIs such as DirectX). The hardware of GPUs on SoCs can deal efficiently with 3D graphics as long as the 3D source is presented to the GPU in the form of vertices (typically of triangles) and textures. The OpenGL application interface then allows setting and control of a virtual perspective camera that determines how 3D objects appear as projected on the 2D screen. Although OpenGL uses 3D objects as input, the output is typically a 2D image on a normal 2D display.

However, whereas such approaches are attractive in many scenarios, it requires that the three dimensional information is provided by a polygon mesh and associated texture information. However, in many applications three dimensional image data may be provided in different formats, such as for example by an image and a depth map.

Indeed, a widely used 3D format is video with a depth map that is typically produced in post-production, estimated from stereo video, or captured using a depth camera. Another frequently used 3D format is using stereo images corresponding to the left and right eye views. Such frequently used formats do not contain static objects represented by polygons and textures.

For such applications, it is therefore desirable to perform a conversion of the video plus depth (or stereo image) format to a format that consists of a polygon mesh and texture image which would be directly suitable for playback using e.g. the openGL algorithms.

However, such conversion is far from trivial and poses a number of complex problems and challenges. Specifically, in order to convert an image with depth map (or stereo images) to geometry (represented by a polygon mesh) and texture it is necessary to convert the depth map to a set of polygons with vertices where each vertex has an x, y and z coordinate. Furthermore, the conversion is typically able to determine the so-called u,v-texture coordinates that specify where each vertex maps onto the video texture. These (u,v) parameters can e.g. be derived from a (x,y) parameters using a projection matrix, or vice versa.

There are different ways known for performing such a conversion into a polygon map. In many applications, preferred properties of the conversion include:
  Polygons should form a mesh where each u,v-texture coordinate maps into a unique location on the 3D polygon mesh.
  The mesh should be contiguous without any holes.
  Polygons should accurately model the depth map.
  The number of polygons should be small to limit GPU load;
  The algorithm for extracting polygons from the depth map should be low-complexity;
  Preferably the conversion can be performed at the client side or at the server side.

However, known algorithms for generating a polygon mesh from an image tend to be suboptimal and suffer from imperfections. Hence, an improved approach for generating a triangle mesh for a three dimensional image would be advantageous and in particular an approach that allows increased flexibility, increased accuracy, a more consistent and/or contiguous triangle mesh, reduced complexity, improved computational efficiency, a representation suitable for subsequent graphics processing, increased compatibility with existing approaches for graphics processing and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided an apparatus for generating a triangle mesh for a three dimensional image, the apparatus comprising: a depth map source for providing a depth map; a tree generator for generating a k-D tree for the depth map, the k-D tree representing a hierarchical arrangement of regions of the depth map satisfying a requirement that a depth variation measure for undivided regions is below a threshold; a triangle mesh generator arranged to position an internal vertex within each undivided region of the k-D tree; and to generate the triangle mesh by forming sides of triangles of the triangle mesh as lines between internal vertices of neighboring undivided regions.

The invention may allow an improved triangle mesh to be generated. The approach may allow more accurate and/or higher quality 3D image or video processing and rendering to be achieved in many embodiments. In many scenarios, an accurate and consistent triangle mesh without any holes may be generated while providing an efficient approach for generating the triangle mesh. In many embodiments, complexity and/or resource usage may be reduced.

The depth map may provide a depth map for the three dimensional image. The three dimensional image may be represented by the depth map and a two dimensional image. The three dimensional image may be part of a larger three dimensional image, e.g. it may be a representation of a three dimensional object in a larger image. The depth map may be a depth map for part of the three dimensional image. The triangle mesh may be partial and may be generated for only part of the three dimensional image. Specifically, the depth map may be provided for (only) a three dimensional object of the image and/or the triangle mesh may be generated for (only) a three dimensional object of the image.

The tree generator 105 may be arranged to divide a region into subregions in response to a detection that the depth variation measure for the region exceeds the threshold. The threshold may be an adaptive threshold. For example, the threshold for a region may depend on a size of the region.

The k-D tree may be a hierarchical tree where each node represents a region of the depth map and with child nodes of a parent node representing subregions of the region represented by the parent node. Regions may specifically be neighboring if they touch at at least one point.

The k-D tree may be generated by iteratively dividing regions into smaller subregions until all undivided regions satisfy the requirement that a depth variation measure is below a threshold. Thus, for the smallest regions of the k-D tree, the depth variation measure is below a threshold and thus the depth may be considered relatively constant in the undivided regions.

An internal vertex is positioned within a region and thus is fully surrounded by the region. An internal vertex is only in contact with one region and thus is not positioned on an edge or border or junction between two or more regions. The triangle mesh may include at least one triangle having a side formed between internal vertices of at least two neighbouring undivided regions. The triangle is accordingly formed to include parts of at least two neighbouring undivided regions, i.e. the triangle spans at least part of two regions and is not restricted to be fully within a single region.

In many embodiments, all triangles of the triangle mesh are generated by forming sides between internal vertices. In many embodiments, at least one triangle is formed by the corners, angles, or vertices of the triangle being three internal vertices of three neighbouring undivided regions. In many embodiments, all triangles of at least a section of the triangle mesh is formed by triangles each of which has corners, angles, or vertices determined as the internal vertices of three neighbouring undivided regions.

The triangle mesh may provide a contiguous three dimensional mesh of triangles.

In some embodiments, the k-D tree may be represented by a two dimensional map corresponding to the depth map with the value for a given position indicating a dimension (specifically size) of the region of which the position is part.

In accordance with an optional feature of the invention, the internal vertex for a region is positioned centrally in the region.

This may facilitate operation in many scenarios while allowing an advantageous triangle mesh to be generated. In particular, it may allow a simple generation of vertices that in many scenarios directly may lead to a contiguous triangle mesh. Specifically, the approach may for a quadtree using square regions be sufficient to ensure that a contiguous triangle mesh is generated. The vertex for a region may be positioned at the geometric center of the region.

In accordance with an optional feature of the invention, the triangle mesh generator is arranged to form a triangle for each junction between three regions, the triangle having sides connecting the internal vertices of the three regions.

This may allow an improved triangle mesh to be generated in many scenarios while keeping complexity and resource usage low. For many types of k-D trees, the approach may (automatically) result in a contiguous triangle mesh to be generated. For example, for a quadtree using square regions, the approach may generate continuously fitting triangles for junctions between three regions.

In accordance with an optional feature of the invention, the triangle mesh generator is arranged to form two triangles for each junction between four regions, the two triangles having a common side connecting internal vertices of two diagonally opposite regions of the four regions, and one triangle being formed by having sides connecting the vertices of the two diagonally opposite regions to an internal vertex of a third region of the four regions and one triangle being formed by having sides connecting the vertices of the two diagonally opposite regions to an internal vertex of a fourth region of the four regions.

This may allow an improved triangle mesh to be generated in many scenarios while keeping complexity and resource usage low. For many types of k-D tree, the approach may (automatically) result in a contiguous triangle mesh to be generated. For example, for a quadtree using square regions, the approach may generate continuously fitting triangles for junctions between four regions.

The triangle mesh generator may be arranged to form two triangles for each junction between four regions, the two triangles having a common side connecting vertices of two diagonally opposite regions of the four regions, and sides connecting the vertices of two diagonally opposite regions to respectively a third region and a fourth region of the four regions.

In accordance with an optional feature of the invention, the k-D tree is a quadtree.

This may provide a particularly efficient implementation in many embodiments while allowing a highly accurate k-D tree useful for determining a triangle mesh to be generated.

In accordance with an optional feature of the invention, the tree generator is further arranged to divide regions in response to a luminance or chroma property of the three dimensional image.

This may provide an improved k-D tree to be generated which subsequently may allow an improved triangle mesh to be generated.

In accordance with an optional feature of the invention, the tree generator is arranged to generate the k-D tree to have rectangular regions that are not constrained to be square regions.

This may in many scenarios result in the possibility of an improved triangle mesh. Specifically, it may in many scenarios allow a closer fitting of the k-D tree to the depth map, and this may in many scenarios result in fewer regions being generated and thus in a triangle mesh with fewer triangles. This may further facilitate subsequent video processing based on the triangle mesh.

The tree generator may thus in many embodiments generate rectangular regions without constraints of these being square.

In some embodiments, at least one of the tree generator and the mesh generator is arranged to divide at least one region in response to a detection that a triangle for three regions forming a junction does not surround the junction.

This may assist in the generation of a contiguous triangle mesh (or may in some scenarios ensure that a contiguous triangle mesh is generated). The approach may allow an efficient implementation, and may in many embodiments provide a low complexity and/or low resource demanding implementation.

In accordance with an optional feature of the invention, the tree generator is arranged to divide a region subject to a constraint that each junction formed by three regions following the division include the junction.

This may assist in the generation of a contiguous triangle mesh (or may in some scenarios ensure that a contiguous triangle mesh is generated). The approach may allow an efficient implementation, and may in many embodiments provide low complexity and/or a low resource demanding implementation.

In some embodiments, the tree generator is arranged to divide a first region subject to an evaluation of a resulting junction between a second region being a neighbour of the first region and two subregions resulting from the division, wherein the evaluation comprises at least one of: an evaluation of whether an intersection point between a common edge of the first region and the second region and a line from a vertex of the second region to a corner of the first region being remote from the second region is closer to the corner than to the junction; an evaluation of whether lines between a vertex of the second region and vertices of the two subregions intersect a common edge between the first region and the second region; and an evaluation of whether the junction is outside of a common edge of the first region and the second region This may assist in the generation of a contiguous triangle mesh (or may in some scenarios ensure that a contiguous triangle mesh is generated). The approach may allow an efficient implementation, and may in many embodiments yield low complexity and/or a low resource demanding implementation.

In accordance with an optional feature of the invention, the tree generator is part of a transmitter and the triangle mesh generator is part of a receiver, and the transmitter is arranged to generate an image data stream representing the three dimensional image and to encode the k-D tree in the image data stream, and the receiver is arranged to extract the k-D tree from the image data stream and provide the k-D tree to the triangle mesh generator.

The approach may allow a very efficient communication of three dimensional information in many scenarios. In many embodiments, the approach may result in a particularly advantageous distribution of functionality and computational resource usage between a server side (the image transmitter) and a client side (the image receiver).

The triangle mesh generator may be arranged to position a vertex within each region of the extracted k-D tree, and to generate the triangle mesh by forming sides of triangles of the triangle mesh as lines between vertices of neighboring regions of the extracted k-D tree.

In accordance with an optional feature of the invention, the transmitter is arranged to apply an image encoding to the k-D tree to generate encoded k-D tree data; and to include the encoded k-D tree data in the image data stream.

The approach may allow a very efficient communication of three dimensional information in many scenarios. In particular, it may in many embodiments allow existing video encoding formats and functionality to be reused or easily adapted to carry information related to triangle meshes.

In some embodiments, the transmitter may be arranged to apply a color or luminance channel encoding to the k-D tree and to include the resulting encoded data in the image data stream.

In some embodiments, the image encoding provides an encoded image representation comprising a plurality of channels, and the transmitter is arranged to encode the depth map in a first channel of the plurality of channels and to encode the k-D tree in the at least a second channel plurality of channels.

The approach may allow a very efficient communication of three dimensional information in many scenarios. In particular, it may in many embodiments allow existing video encoding formats and functionality to be reused or easily adapted to carry information related to triangle meshes.

In some embodiments, the transmitter may comprise a video encoder arranged to encode a video representation comprising a luminance channel and at least one color channel, and the transmitter is arranged to encode the depth map in the luminance channel and the k-D tree in the at least one color channel.

In some embodiments, the image encoding provides an encoded image representation comprising at least two color channels, and the transmitter is arranged to encode vertical region information for the k-D tree in one color channel of the at least two color channels and horizontal region information for the k-D tree in another color channel of the at least two color channels The approach may allow a very efficient communication of three dimensional information in many scenarios. In particular, it may in many embodiments allow existing video encoding formats and functionality to be reused or easily adapted to carry information related to non-square region triangle meshes.

In accordance with some embodiments of the invention, the apparatus further comprises an image encoder for encoding the three dimensional image wherein the image encoder is arranged to encode the image using the k-D tree.

This may provide highly efficient operation in many embodiments and may in particular reduce complexity and/or resource usage and/or bandwidth used/necessary for distribution/communication.

According to an aspect of the invention there is provided, a method of generating a triangle mesh for a three dimensional image, the method comprising: providing a depth map; generating a k-D tree for the depth map, the k-D tree representing a hierarchical arrangement of regions of the depth map satisfying a requirement that a depth variation measure for undivided regions is below a threshold; positioning an internal vertex within each undivided region of the k-D tree; and generating the triangle mesh by forming sides of triangles of the triangle mesh as lines between internal vertices of neighboring undivided regions According to an aspect of the invention there is provided an apparatus for generating a triangle mesh, the apparatus comprising: a receiver for receiving a video signal comprising image data providing a representation of a three dimensional image and a k-D tree for a depth map of the three dimensional image, the k-D tree representing a hierarchical arrangement of regions of the depth map satisfying a requirement that a depth variation measure for undivided regions is below a threshold; and a triangle mesh generator arranged to position an internal vertex within each region of the k-D tree; and to generate the tringle mesh by forming sides of triangles of the triangle mesh as lines between internal vertices of neighboring regions.

In accordance with some embodiments of the invention, the apparatus further comprises a decoder for decoding the three dimensional image from the image data; the decoding being in response to the k-D tree.

This may provide highly efficient operation in many embodiments and may in particular reduce complexity and/or resource usage and/or bandwidth used/necessary for distribution/communication.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

Figure 1:
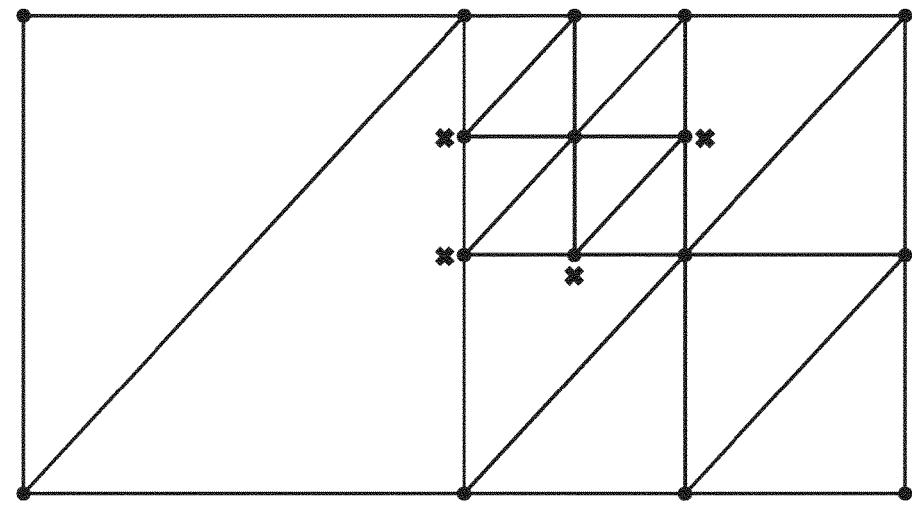
FIG. 1 is an illustration of a possible determination of a triangle mesh from a k-D tree of a depth map.

Many 3D image (including video) processing algorithms and processes are based on the use of triangle meshes as this may provide high computational efficiency in many embodiments. However, in many embodiments, a three dimensional image may be received in other formats. For example, a two dimensional image with an associated depth map may be received and this accordingly cannot be used directly with such triangle mesh based algorithms. Therefore, it is desirable to have an approach for converting a 3D image represented by a two dimensional image and depth into a triangle mesh.

It will be appreciated that such an approach can also be used when an input in another format is received. For example, if a three dimensional image is received as a plurality of images corresponding to different viewpoints, and specifically if a 3D image is received as a stereo image, this may be converted into a two dimensional image and associated depth map. For example, one of the images may be used directly with the corresponding depths being determined based on the disparity between corresponding objects in the different images.

One approach for generating a triangle mesh from an image and depth map is to use an approach where a quadtree, or more generally a k-D tree, is generated, first with the triangle mesh subsequently being generated from the quad tree/k-D tree. Quadtrees have specifically been used in some forms of video encoding such as specifically in the High Efficiency Video Coding (HEVC (H.265)) standard.

In a k-D tree or specifically a quadtree, each node represents a region (e.g. it may represent a bounding box covering some part of the space being indexed), with the root node covering the entire space. If a condition is met for a region, this region is divided into n sub-regions. In such a case, the node corresponding to the region is given a (typically predetermined) number of child nodes where each node may represent a sub-region. These nodes may then be further processed to potentially be partitioned further. In this way, a hierarchical tree is built up.

A quadtree specifically provides a spatial sub-division of an image by applying an algorithm that recursively splits square regions into four new squares. Specifically, a quadtree is a tree data structure in which each internal node has exactly four children. Quadtrees are most often used to partition a two-dimensional space by recursively subdividing it into four quadrants or regions. The subdivision is typically into regions in which a given property is sufficiently homogenous in accordance with a suitable criterion. Thus, when a region is determined to have a variation of the property which increases above a given threshold, the region is divided into four smaller regions. The process is repeated iteratively resulting in a hierarchical tree with the number of levels, and thus the size of the squares, typically varying across the image.

A quadtree is a specific example of a k-D tree where rectangles of arbitrary size and aspect ratio may be used. Thus, a k-D tree is a space portioning data structure in which partitions/regions are iteratively divided into smaller partitions/regions until the individual partitions/regions meet a homogeneity criterion. The partitions/regions are rectangular but may in principle be any size and shape. Indeed, the division of a partition/region into sub-partitions/regions may be adaptive and dependent on various properties and parameters, and specifically may be dependent on the properties within the sub-partitions/regions. Thus, for a k-D tree, a division of a region/partition into sub-regions/partitions may result in different numbers and shapes of the sub-partitions/regions depending on properties typically within the partition/region.

In contrast, for a quadtree, each region is divided into four sub-regions when being partitioned resulting in each node having exactly four children. In such a quadtree, all regions are further square regions and thus a division is into four identical square subregions.

The k-D tree generated in the current approach is specifically for a two-dimensional map (the depth map) and the k-D tree is therefore specifically a 2-D tree. Specifically, the 2-D tree may be a quadtree where each division of a region is into four identical and square regions, and thus where each node has four children (or none).

If a quadtree or k-D tree algorithm is applied to the depth map, this may recursively be divided into homogeneous regions until some homogeneity criterion is met. However, from this sub-division it is not obvious how a triangular mesh could or should be constructed.

One approach may be to position vertices of the triangles of the triangle mesh on each junction point of such a quad-tree and then connect these to form squares, after which each square can be split into two triangles. FIG. 1 illustrates an example of such an approach. FIG. 1 specifically shows a small section of a quadtree for a depth map being divided into regions.

A problem with this mesh is that at some vertices (indicated by a cross in the figure), it is not advantageous to directly use the depth value $D(i, j)$ of the corresponding pixel location $(i, j)$. Specifically, the identified points also lie on an intermediate position of another triangle edge. The depth $D(i, j)$ of the depth map at the intersection point $(i, j)$ may be different than the depth which is given by a linear interpolation between the two vertices of the side on which the intersection point $(i, j)$ lies. Therefore, using the depth map value $D(i, j)$ directly would likely result in holes in the three dimensional mesh being generated. An approach to avoid introducing such holes could be to determine the interpolated value between the vertices of the side and then use this. However, typically such an approach is computationally very unattractive since it has been found to make the mesh calculation complex and computationally intensive.

Figure 2:
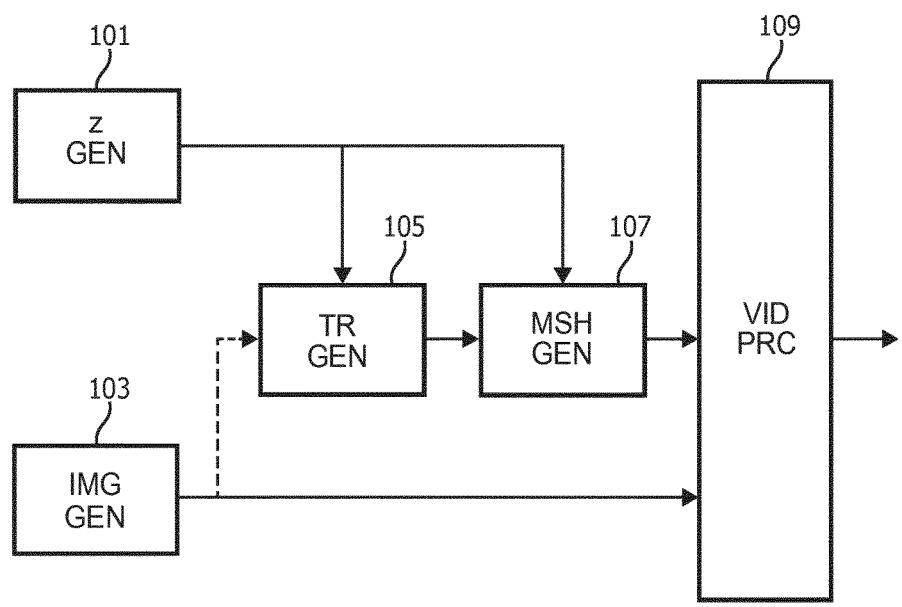
FIG. 2 is an illustration of an example of an apparatus for generating a triangle mesh in accordance with some embodiments of the invention.

FIG. 2 illustrates an example of an apparatus for generating a triangle mesh in accordance with some embodiments of the invention. The approach may provide an improved triangle mesh in many scenarios and may specifically avoid or mitigate some of the previously described disadvantages. Specifically, the apparatus may allow accurate triangle meshes to be generated while maintaining a relatively low computational resource demand.

FIG. 2 illustrates an apparatus which specifically can generate a triangle mesh for a three dimensional image (e.g. for an image object of the three dimensional image) based on a depth map for the three dimensional image. Thus, in the example, a three dimensional image is represented by a two dimensional image and an associated depth map. However, it will be appreciated that in other embodiments, other formats may be used. For example, rather than a two dimensional image, a z-stack may be provided which also includes information on occluded pixels.

In the example, the apparatus comprises a depth map source 101 which is arranged to provide a depth map for the three dimensional image, and an image source 103 which is arranged to provide a two dimensional image corresponding to the depth map.

It will be appreciated that the depth map source 101 and the image source 103 may in many embodiments be a common source. For example, in many embodiments, the apparatus may comprise a receiver which receives a three dimensional video stream comprising a sequence of three dimensional images represented by two dimensional images and associated depth maps. The receiver may be arranged to decode this data stream and for each three dimensional image provide the corresponding image and depth map. Thus, the receiver may implement the functionality of both the depth map source 101 and the image source 103.

The depth map source 101 is coupled to a tree generator 105 which is arranged to generate a k-D tree from the depth map. The k-D tree is generated to represent a hierarchical arrangement of regions which meet a requirement that a depth variation measure for the undivided regions is below a threshold.

Thus, the tree generator 105 is arranged to perform the generation of the k-D tree based on a depth variation measure. It is arranged to divide a region into a set of sub regions, i.e. to generate a set of child nodes corresponding to the subregions for a parent node corresponding to the region, if the depth variation measure for the region exceeds a given threshold. As this approach is applied iteratively until all generated regions meet the criterion, the approach results in a division of the depth map into undivided regions for which the depth is relatively constant. Indeed, for the smallest regions, i.e. the undivided regions, the depth variation measure is below a threshold and thus the variation of depth in each (undivided) region is ensured to be sufficiently constant (according to the characteristics of the individual embodiment).

It will be appreciated that the degree of depth variation that is accepted within each (final/undivided) region of the k-D tree will be depend on the preferences and requirements of the individual embodiment. Similarly, the exact depth variation measure that is used may depend on the preferences and requirements of the individual embodiment and it will be appreciated that any indication of a variation of a depth within a region suitable for the individual embodiment may be used.

As an example, a depth variation measure corresponding to the difference between the highest and lowest depth value within a region may be used. In such a scenario, the tree generator 105 thus divides the depth map into a set of regions where the maximum depth difference is less than a given threshold. This may thus generate regions that may be considered to be sufficiently homogenous to potentially be represented as a single triangle of a triangle mesh.

It will be appreciated that various algorithms for generating a k-D tree based on a given requirement are known to the skilled person and that any suitable approach may be used without detracting from the invention.

The tree generator 105 is coupled to a triangle mesh generator 107 which is arranged to generate a triangle mesh in response to the k-D tree generated by the tree generator 105. The mesh generator 107 is arranged to generate the mesh by positioning a vertex within each (undivided) region of the k-D tree and then to generate the triangle mesh by forming sides of triangles of the triangle mesh as lines between vertices of neighboring regions. Thus, mesh generator 107 is arranged to position the vertices of the triangles within the regions rather than at the junctions between regions. Specifically, for each region, one vertex may be generated and positioned within the region rather than on a side of the region or on an intersection point/junction where two or more regions join. Thus, in the approach of mesh generator 107, vertices are generated which belong to only one region (each vertex may be in contact with only one region/be surrounded by the region).

In the approach, the generated vertices are accordingly internal vertices that are positioned within a region. Thus, each internal vertex is in contact with only one region/is fully surround by only a single region and thus is not positioned on a border, edge or junction between the regions. In the following, the terms vertex/vertices will be used to specifically refer to internal vertices/vertexes as appropriate, i.e. for brevity internal vertices fully surrounded by a region (and not on the border between two or more regions) will simply be referred to as vertices.

In many embodiments, the vertex for a given region may be created at a centre of the region. The vertex of a region may thus be positioned at the geometric center of the region.

However, it will be appreciated that this is not essential and that indeed in other embodiments the vertices may be positioned non-centrally, or even that the position may vary dynamically and/or adaptively between different regions.

The triangle mesh generator 107 may then generate the triangles by connecting these internal vertices. Typically, lines may be formed between the vertices and the resulting triangles may be used to form the triangle mesh.

Since the vertices are internal vertices, a triangle formed by using these internal vertices will not be restricted to one region but will inherently include parts of a plurality of regions. Thus, each of (at least some of) the formed triangles will extend over a plurality of regions.

In many embodiments, the junctions i.e. intersections between different regions may be used when forming the triangles, and specifically may be used to select which vertices are used to form an individual triangle.

Specifically, for a junction where three regions meet each other, a triangle may be formed with the three internal vertices of those three regions being vertices of a triangle. The formed triangle is accordingly a triangle that includes elements of each of the three regions meeting at the junction. Thus, the junction itself is not a vertex of the formed triangle but rather is used to select which regions/internal vertices are used to form the resulting triangle. As will be described in more detail later, the position of internal vertices and the generation of the triangle is typically such that the junction between the regions will fall within the triangle (i.e. the three dimensional point of the junction will in the triangle mesh be represented by a point of the generated triangle using the internal vertices of the three regions meeting at the junction).

The triangle mesh generator may in many embodiments be arranged to form a triangle for each junction between three regions where the triangle has sides connecting the internal vertices of the three regions. Thus, a set of triangles may be generated with each of these triangles overlapping or extending across three different regions (as all the vertices are internal vertices). For junctions where four regions meet each other, two triangles may be formed by the four internal vertices of the four regions. In such a scenario, the triangle mesh generator 107 may form one common side of the two triangles as the line between two diagonally opposite regions (i.e. between two regions that do not have a common side). One triangle may then be formed by further including the vertex of one of the remaining two regions and the other may be formed by further including the vertex of the last remaining region.

Thus, in some embodiments, the triangle mesh generator 107 may be arranged to form two triangles for each junction that exists between four regions. The two triangles have a common side connecting vertices of two diagonally opposite regions of the four regions. One triangle is then formed by generating the triangle to have sides connecting the vertices of the two diagonally opposite regions to a vertex of a third region of the four regions. The second triangle is formed by having sides connecting the vertices of the two diagonally opposite regions to a vertex of a fourth region of the four regions.

In other words, the triangle mesh generator 107 may be arranged to form two triangles for each junction between four regions where the two triangles have a common side connecting vertices of two diagonally opposite regions of the four regions, and sides connecting the vertices of two diagonally opposite regions to a third region and a fourth region of the four regions respectively.

As for the scenario where a triangle is formed for a three-region junction, the two triangles formed for a four-region junction will also be formed from internal vertices and thus each of the triangles will not be restricted to a single region but will extend over three different regions.

For a quadtree with rectangular regions, the approach of generating triangles for each junction may result in a contiguous trangle mesh being generated with no holes.

The approach may result in improved generation of triangle meshes. Indeed, in many embodiments, the approach may, based on relatively simple and low complexity processing, generate a triangle mesh which is not only highly accurate but also inherently avoids the generation of holes in the mesh.

Figure 3:
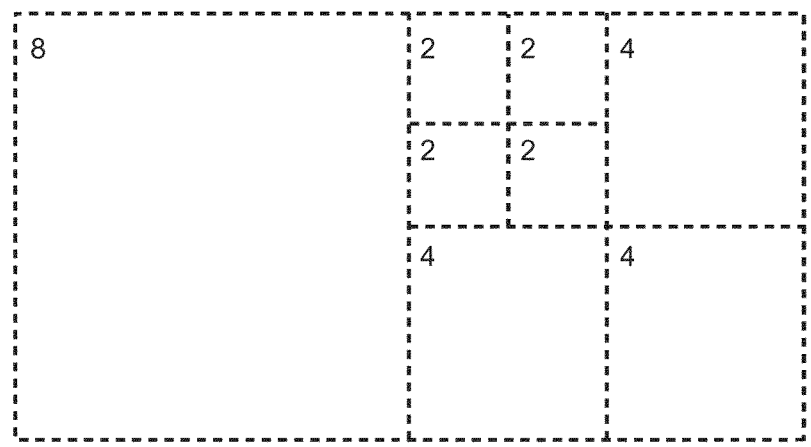
FIG. 3 is an illustration of a section of a quadtree determined in accordance with some embodiments of the invention.

It is noted that the approach has been found to provide an accurate and useful triangle mesh. This is surprising as the approach is counterintuitive by inherently breaking with a fundamental assumed principle of generating triangle meshes from a k-D tree. In particular, the k-D tree is used to generate individual regions where the depth variation is very low. The most intuitive approach is thus as previously described to form the triangles within each region as it can be ensured that the individual region has low depth variation. This leads to the generation of triangles between vertices of the same region, i.e. it leads to generation of triangles between the junctions/intersections of the regions. Effectively, it may lead to each rectangular region being represented by two triangles formed by dividing the region by a diagonal However, a fundamental and important feature of the approach of the system of FIG. 3 is thatthe triangles are not formed within one region but rather are formed between regions. Thus, the triangles overlap a plurality of regions, and thus the resulting triangles will include sections of different regions. This counterintuitive approach accordingly does not restrict the triangles to be within a single region in which the depth is constrained by the k-D tree generation but forms the triangles across a plurality of regions that are not in general depth variation constrained. It has been found that surprisingly despite no restrictions being imposed on depth variations between neighboring regions, a highly efficient and accurate triangle mesh tends to be generated. Further, this generation inherently avoids holes in the triangle mesh In the following, a specific embodiment will be described in more detail which uses a quadtree. Thus, in the specific example, all regions are square and each subdivision of a region is into four children/sub regions. Further, in the specific example, the vertices are positioned centrally in the individual regions.

In the embodiment, the triangle mesh generator 107 does not split each square in the quadtree into two but rather it constructs triangles based on junctions where three or four quadtree regions meet. Instead of placing vertices at the junctions, a single vertex is positioned in the center of each region. A single triangle is then constructed for each junction where three quadtree regions meet. The triangle is constructed by connecting the three vertices of the three regions that meet, i.e. the sides of the triangle are formed by the lines connecting the three pairs of vertex points of the three regions. For a quadtree where all regions are square, this will inherently result in the generated triangle surrounding the junction and this will result in a consistent triangle mesh being generated without holes.

For junctions where four regions meet, two triangles are constructed. The two triangles are constructed by first selecting the vertices of two diagonal regions (two regions that only touch at the junction and which do not have any shared edge). These two vertices are common for the two triangles whereas the remaining two vertices are only part of one triangle. Thus, the first triangle is formed by the two common vertices and a third of the vertices and the second triangle is formed by the two common vertices and the last vertex.

In this way, two triangles are formed which for the map formed by square regions will result in the common side/edge running through the junction point. It furthermore, together with the above approach for generating triangles for three way junctions, results in an automatic generation of a contiguous triangle mesh with no holes.

This algorithm may for example be implemented using a hierarchical search through the quadtree data structure.

Figure 4:
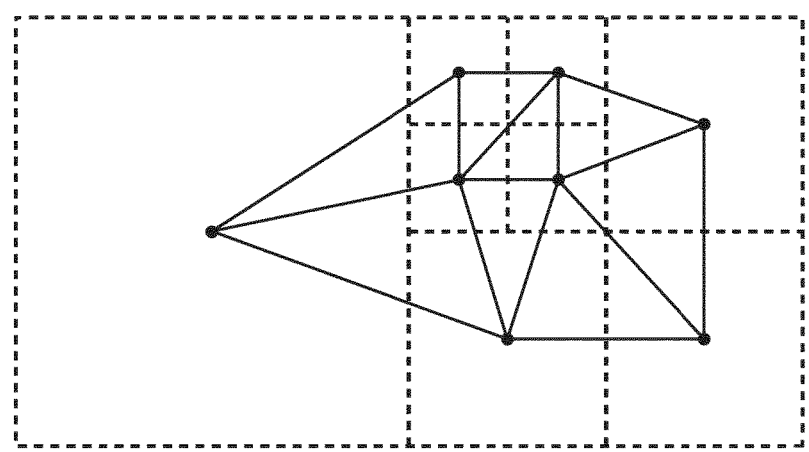
FIG. 4 is an illustration of possible determination of a triangle mesh for a section of a quadtree in accordance with some embodiments of the invention.

As an example, the (small) quadtree section of FIG. 3 may be considered. In the example, the number in each region indicates the size of each region (indicated by a length of a side of the square region). For this small local structure, a vertex may be positioned within each region and triangles may be formed using the approach described above. FIG. 4 illustrates a possible result. As can be seen, a consistent triangle mesh with no holes is generated.

In the example, some specific handling of the edges of the quadtree may be included. For example, the system may add all quadtree region corners on the image border as vertices. For each such vertex on the image border, three triangles may be created (if not already created). Two of those triangles may be within the two squares of that corner (connecting the two border vertices with the center vertex of a square), and the third one may connect the edge vertex with the two center vertices. This may extend the triangle mesh to the edge of the image. It will be appreciated that in other embodiments, other approaches may be used (including simply generating a triangle mesh that does not extend fully to the edge of the image, i.e. the triangle mesh may be generated using only the vertices internal to the regions).

The process that computes the mesh from the quadtree can specifically be performed efficiently since the locations of junctions between adjacent squares are defined by the quadtree data structure. For instance if the largest region has a size of 128 pixels, then it is known that the start of a 128 region in x, or y-direction is always located at a multiple of 128 pixels in both directions. Using this knowledge, an efficient algorithm can be derived that recursively visits all region corners starting from the largest region size (e.g. 128) and ending at the smallest region size (e.g. 4) in the quadtree. A smaller region only needs to be evaluated in case it is present at a certain location in the quadtree.

An example of a pseudo-code for an algorithm that may be applied by the triangle mesh generator 107 to generate the triangle mesh is the following:

```
for all 128 blocks in image
    if Q(x, y) < 128
        for all 64 blocks in 128 block
            if Q(x, y) < 64
                for all 32 blocks in 64 block
                    if Q(x, y) < 32
                        ...
                    else
                        CalculateTriangle32Block(x, y)
                    end
            else
                CalculateTriangle64Block(x, y)
            end
    else
        CalculateTriangle 128Block(x, y)
    end
end
```

In this approach, the triangle mesh generator 107 determines the triangles from the bottom-up in the sense that it first identifies the smallest regions and forms the triangles involving these regions, then identifies the next smallest regions and forms triangles for these (while skipping those that involve a smaller region and which accordingly have already been formed at the lower level). The algorithm continues this approach until all regions have been processed.

In the specific example, the apparatus of FIG. 2 further comprises a video processor 109 which receives the two dimensional image and the triangle mesh, and which is arranged to perform a three dimensional video processing to generate an output image. The video processor 109 may for example generate a new view using an openGL (see e.g. https://www.opengl.org/about/) or DirectX (see e.g. https://msdn.microsoft.com/library/windows/apps/hh452744) rendering pipeline. For example, the video processor 109 may use the generated triangle mesh to perform view shifting or view synthesis The exact approach for generating the k-D tree may vary between different embodiments and the exact depth variation measure and criterion for when this exceeds a threshold requiring splitting may vary between different embodiments.

In some embodiments, the depth variation measure may specifically be generated as the difference between the maximum and the minimum value in the region. If this exceeds a predetermined threshold, the region is divided into subregions.

In many embodiments, the depth variation measure for a region may advantageously be determined as a maximum difference between an average depth of the region and an average depth of each subregion that the region will be divided into if the region is divided.

Alternatively (or additionally), the depth variation measure for a region may advantageously be determined as a maximum difference between an average depth of pairs of subregions that the region will be divided into if the region is divided.

Such approaches may be particularly efficient and may in particular be computationally very efficient.

Specifically, the determination of the depth variation measure may be based on an integral image generated for the depth map. In an integral image for a depth map, the value at a given position x,y is given as the integral (summation) of depth values in a rectangle (typically) with the lowest right corner at position x, y. Thus, an integral image contains values reflecting the accumulated values in the region above and to the left of the position.

As an example, when an integral image is used, the decision whether to split the region could be based on the maximum absolute difference between the mean depth values of the parent region and the four children regions. For instance, a 32×32 square block would then be split into four 16×16 blocks if:

$$\max_{k \in \{1,2,3,4\}} (|\overline{D}_{32} - \overline{D}_{16}^{(k)}|) > T,$$

where k indexes each 16×16 child block.

The computational benefit of this criterion comes from the use of an integral image where the calculation of each block average may consist of four lookup operations in the integral image, 2 subtractions, 1 addition and one bit shift. (Note that the bit shifting operation results from the fact that the number of pixels in a square block is always a power of 2).

The criterion for this approach may thus be based on the differences between block averages. Specifically, per-pixel values averaged across a block may be considered. Hence, big and small blocks may have values in a similar range, e.g. [0, 255]. It may in such embodiments be beneficial to make the threshold block size adaptive, i.e., it may use a low threshold to split for the largest block and increase the threshold with decreasing block size to prevent an excess of small blocks.

It will also be appreciated that the determination of whether to subdivide a region or not when generating the k-D tree may take other parameters into account than just the depth values. Thus, the generation of the k-D tree for the depth map need not exclusively be based on the depth map itself.

Indeed, in many embodiments, the tree generator 105 may be arranged to form regions in response to a luminance or chroma property of the three dimensional image. Specifically, the three dimensional image may include one or more two dimensional images representing the visual information, i.e. the two dimensional images may comprise luminance or chroma (including combined chrominance) information. In some embodiments, the tree generator 105 may take into account this information when determining whether to divide a given region.

For example, for a given region, the tree generator 105 may determine a depth variation measure. It may further determine a chrominance (including e.g. a pure luminance or pure chroma) variation measure. The measure may for example be determined as maximum luminance difference or the maximum chroma difference (e.g. within one color channel or an average over all color channels). The tree generator 105 may then evaluate both the depth variation measure and the chrominance variation measure and divide the region if either of these two measures is over a respective threshold.

As another specific example, in some coding standards, such as H.265, a k-D tree is generated as part of the image/video encoding based on parameters of the image/video being encoded. In such scenarios, the k-D tree generated for the image/video encoding may be reused (possibly further refined based on the depth map).

The inclusion of image parameters when considering subdivisions of regions may result in an improved triangle mesh being generated.

In the previous specific example, the generated k-D tree is a quadtree using square regions. However, a particular advantage of the described approach is that it is not limited to such quadtrees and indeed that it does not necessarily impose substantial constraints on regions forming the k-D tree or on the algorithm for generating this.

Thus, in many embodiments, the tree generator 105 may be constrained to generate only square regions, and specifically each subdivision into subregions may be by creating four child regions. Thus, in some embodiments, the tree generator 105 may be constrained to generate a quadtree. However, in many other embodiments, the generation may generate a k-D tree comprised of rectangular regions that are not constrained to be square regions.

For example, a k-D tree based on rectangles but not (necessarily) squares may be represented by two partial k-D tree where one represents the horizontal division and one represents the vertical division.

E.g. instead of using a single quadtree representation Q(i, j), two sub-trees may be considered, namely a horizontal tree $Q_h(i, j)$ and a vertical tree $Q_v(i, j)$, in order to model horizontal and vertical variation separately. Using such a rectangular tree may typically result in a reduced number of triangles in the triangle mesh as it requires less subdivisions to describe (commonly occurring) horizontally or vertically elongated structures.

Figure 5:
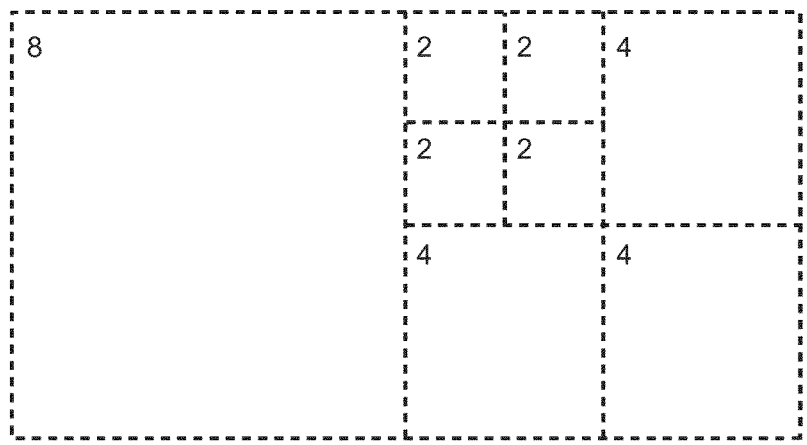
FIG. 5 is an illustration of a section of a quadtree determined in accordance with some embodiments of the invention.
Figure 6:
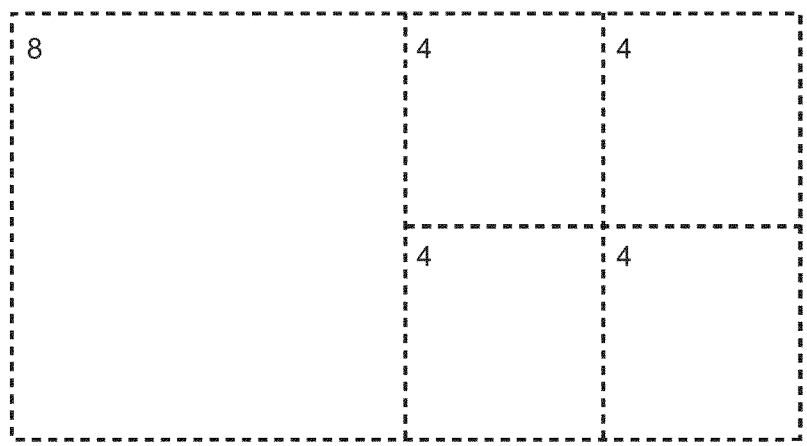
FIG. 6 is an illustration of a section of a quadtree determined in accordance with some embodiments of the invention.
Figure 7:
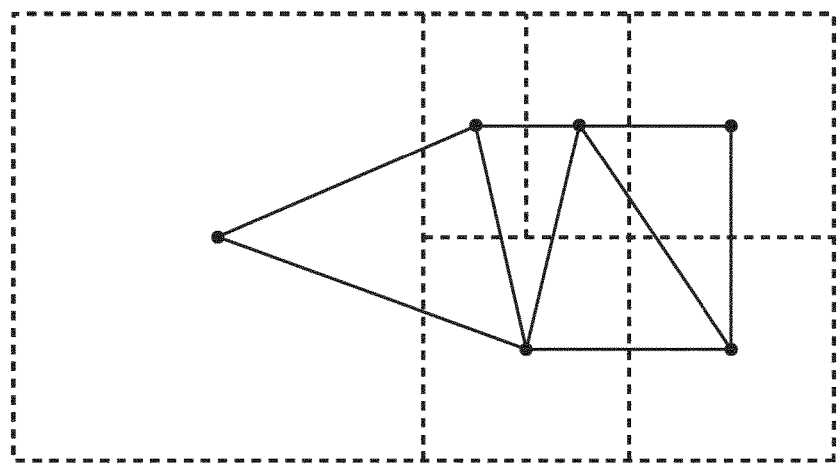
FIG. 7 is an illustration of possible determination of a triangle mesh for a section of a quadtree in accordance with some embodiments of the invention.

FIG. 5 illustrates an example of a small section of a horizontal sub-tree $Q_h(i, j)$ and FIG. 6 illustrates an example of the corresponding small section of a vertical sub-tree $Q_v(i, j)$. FIG. 7 illustrates the resulting section of the overall quadtree. FIG. 7 also illustrates the resulting triangles that may be generated.

Thus, in these examples, the tree generator 105 is thus arranged to generate the regions as rectangles, and specifically the separation of regions in the horizontal and vertical directions may be different. The tree generator 105 may for example use vertical splits to segment out upright structures, such as walls and poles, and horizontal splits to segment out foreground-background depth jumps. Both horizontal and vertical splits may be used for diagonally running structures.

However, whereas a quadtree will automatically result in a contiguous and consistent triangle mesh being generated by connecting the center vertices, this cannot be guaranteed for a rectangular k-D tree with no constraints on the dimensions of the rectangles.

Figure 8:
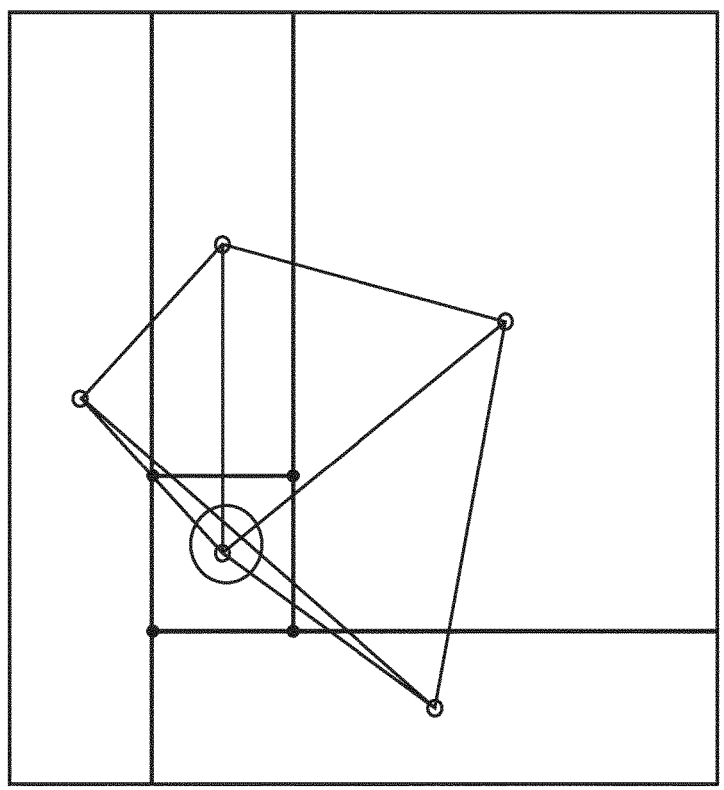
FIG. 8 is an illustration of possible determination of a triangle mesh for a section of a quadtree.

This is illustrated by FIG. 8 which shows an example of triangles resulting from connecting the vertices at the centers of a set of regions in a section of a k-D tree using rectangular (but not necessarily square) regions. As can be seen, the resulting triangles overlap and will further not provide a contiguous triangle mesh but rather will result in a mesh with holes.

In contrast, for a quadtree (i.e. with all regions being square) it can be shown that a situation such as that of FIG. 8 can never occur. To illustrate this, a very large block (e.g. 128×128) next to a 1×1 block may be considered. In such a scenario, it is still always possible to draw a line between the centers of the two blocks without the line being outside of the two blocks. This is the case regardless of where they are in contact with each other.

Thus, in many embodiments, a quadtree may be used as it can ensure a contiguous triangle mesh being generated. In some embodiments, the generation of the k-D tree may be subject to some constraints that will ensure that a contiguous map is generated.

In many embodiments, the system may be arranged to ensure that the generated junctions between three regions is included in the triangle formed by the vertices of these three regions. This may prevent scenarios such as that illustrated in FIG. 8 from occurring.

In some embodiments, the tree generator 105 is arranged to subdivide a region subject to a constraint that each triangle formed by three neighbor regions following the subdivision include the junction. Thus, in such an example, if the tree generator 105 determines that a region needs to be divided, it may consider the junctions that will be created by this division. It may furthermore consider whether these junctions fall within the triangles that result from the center points of the new regions being connected. If so, it proceeds to make the division and otherwise it does not subdivide the region.

As another example, in some embodiments, the tree generator 105 and/or the triangle mesh generator 107 is arranged to subdivide at least one region in response to a detection that a triangle for three regions forming a junction does not surround the junction. Thus, in such examples, the system may detect that a junction between three regions does not fall within the triangle formed by the vertices of the three regions, and in response it may further divide at least one of the regions. Thus, in this case, two triangles may end up being generated instead of one. It will be appreciated that the consideration may be applied iteratively, i.e. it may be ensured that the subdivision results in all junctions falling within the triangles formed by the vertices of the three joining regions.

In many embodiments, the tree generator 105 may be arranged to subdivide a first region subject to an evaluation of a resulting junction between a second region being a neighbor of the first region and two sub-regions resulting from the subdivision. Thus, when considering whether to divide a region, the tree generator 105 may consider the junctions that will be formed between the new sub-regions and the existing neighbor regions. It may consider characteristics of the position of this junction relative to other points and may only perform the subdivision if a given requirement is met.

Figure 9:
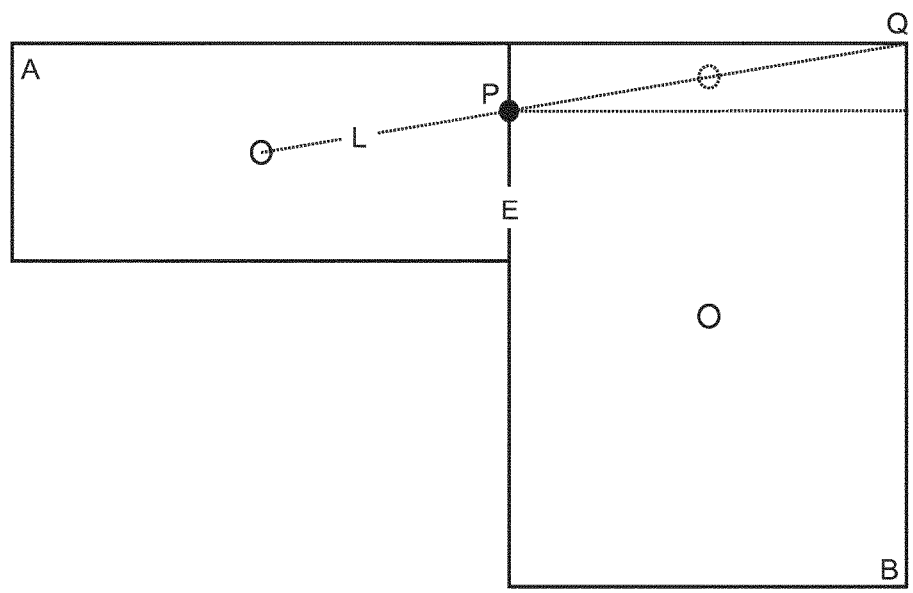
FIG. 9-11 illustrate examples of possible considerations when generating a k-D tree in accordance with some embodiments of the invention.
Figure 10:
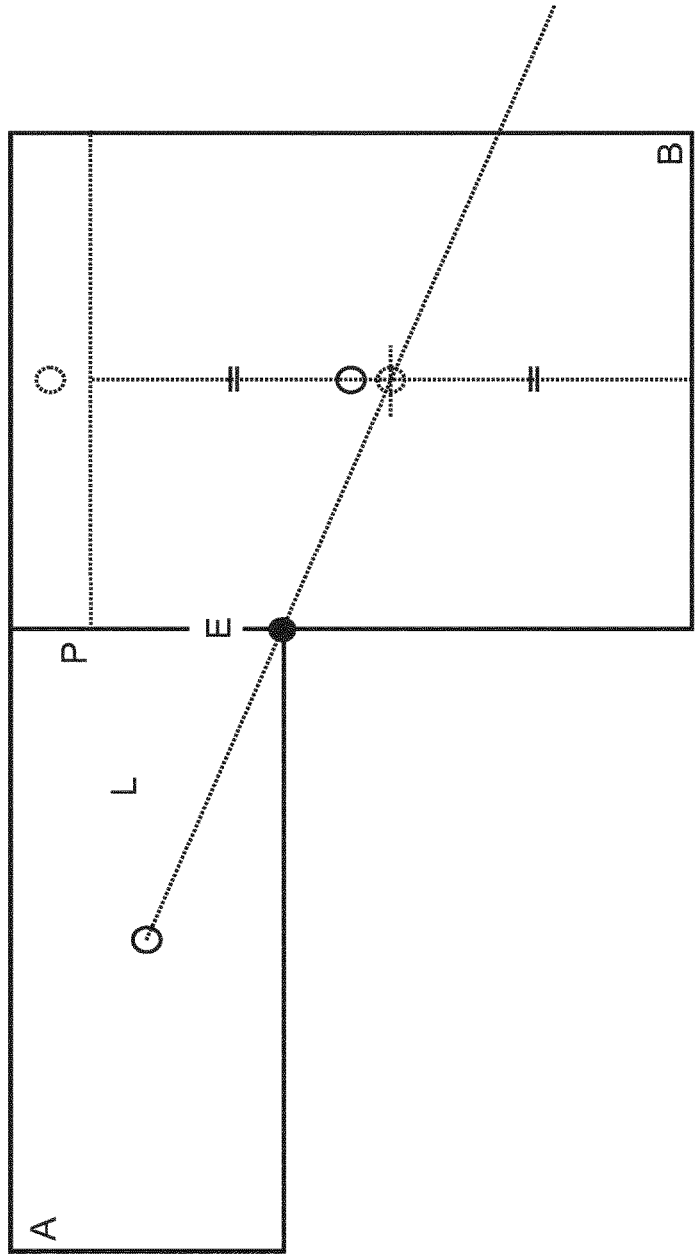
Figure 11:
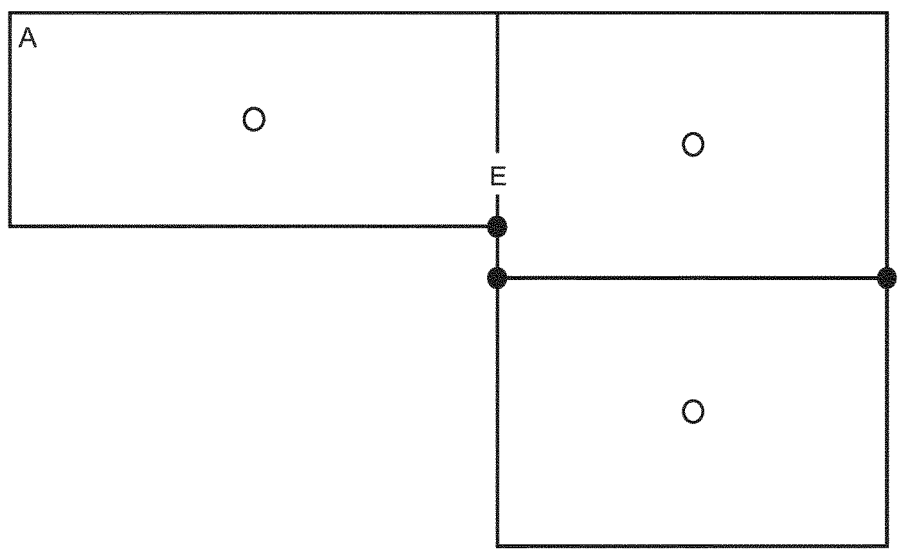

Some examples may be provided with respect to FIGS. 9-11 which reflect that whenever two regions A and B touch each other along line piece E, then region A might impose constraints on region B for subdividing region B perpendicularly and along line piece E in order to generate two sub-regions of B.

Specifically in some embodiments, the division may be subject to an evaluation of whether an intersection point between a common edge of the first region and the second region and a line from a vertex of the neighbor region to a corner of the region being divided (the corner being remote from the neighbor region) is closer to the corner than to the junction.

Thus, with respect to the example of FIG. 9, the constraint is that when the center of A can be connected to an opposite corner Q of B by a line L, for each such L and Q, when the line L intersects line piece E at P, then it is only allowed to split B along E on the side of P that is away from corner Q.

In some embodiments, the division may be subject to an evaluation of whether lines between a vertex of the second region and vertices of the two sub-regions intersect a common edge between the first region and the second region Thus, with respect to the example of FIG. 10, the constraint is that the centers of the sub-regions of B have to be connectable with the center of A by a line through E.

In some embodiments, the division may be subject to an evaluation of whether the junction is outside of a common edge of the first region and the second region. If so, division may be performed.

Thus, with respect to the example of FIG. 11, region A imposes no constraints outside of line piece E.

The division constraints provided above may impose constraints on the line that passes through the centers of a neighboring region and any new adjacent subregion formed by a division to be entirely within the neighboring region and the subregions. If the line were to intersect another region or subregion, then extremely shallow triangles and/or a hole can form.

As previously mentioned the constraints and considerations may be taken into account when performing subdivisions to generate the k-D tree or may in many scenarios be considered iteratively e.g. together with the generation of the triangle mesh. For example, the described constraints may be considered when generating a k-D tree and the resulting k-D tree may be used to form the triangle mesh. Alternatively, no constraints may be employed when first determining the k-D tree. This k-D tree may then be used to generate a trial triangle mesh and if the constraints are not satisfied this may be detected at this stage. The k-D tree may then be modified to overcome this breach of the constraints.

As mentioned, if it is detected that a constraint is not met, the apparatus may prevent a subdivision. In other scenarios, it may add a further subdivision. E.g. if it is found that a constraint is not met during a generation of a triangle mesh, the apparatus may, rather than remove the corresponding division, introduce a new division to generate smaller regions for which the constraint is met.

As another example, the system may in some embodiments be arranged to determine a position of at least one vertex in order for a constraint to be met. E.g. the system may be arranged to position vertices such that all three-way junctions are within the triangles formed by the vertices of the corresponding three regions. The tree generator 105 may for example first position all vertices in the center. If it is then found that this results in one junction being outside the corresponding triangle, then it may proceed to move the position of one or more vertices until the constraint is met, i.e. until the junction falls within the triangle. The tree generator 105 may for example try a different position (e.g. a random position) for a given region and check whether the constraint is met. If so, the vertex is kept at this position and otherwise another position is selected and evaluated.

In the example of FIG. 2 and the previous description, the described functionality has been considered to be co-located. However, the Inventors have realized that particularly efficient communication of the three dimensional image information can be achieved by a distribution of functionality. Specifically, they have realized that particularly attractive communication of three dimensional information is possible using the k-D tree as part of the data stream providing the three dimensional image.

Figure 12:
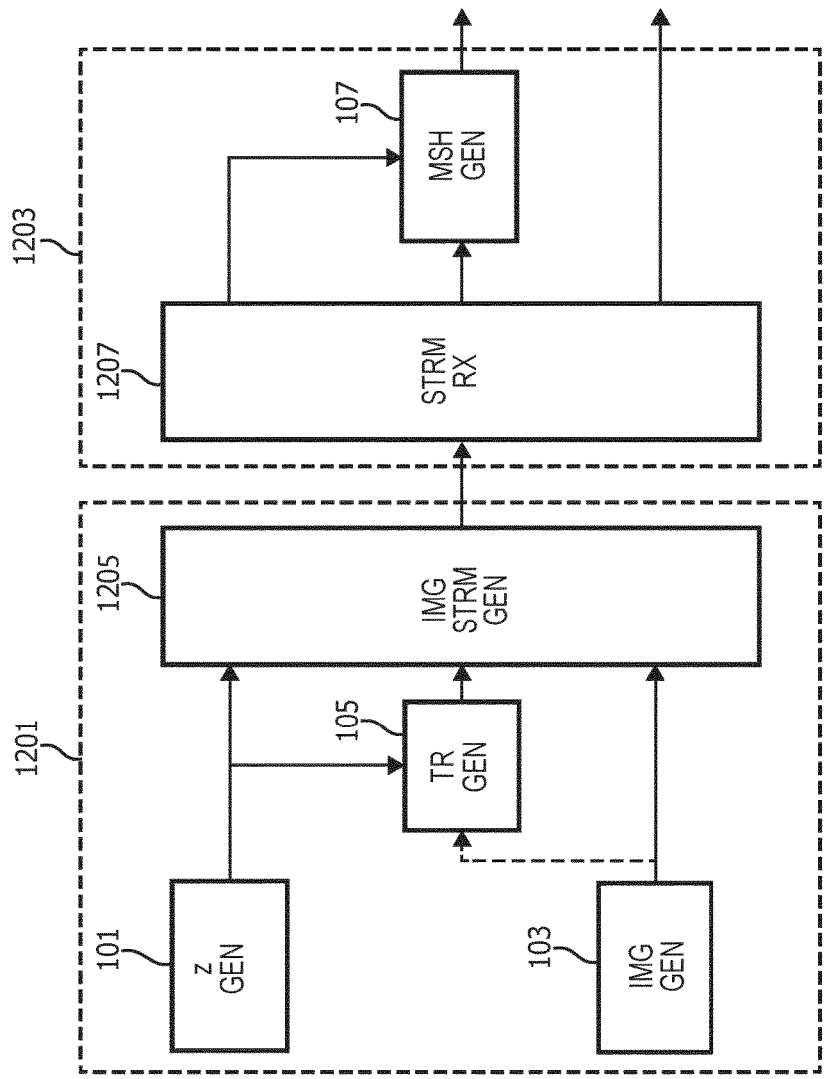
FIG. 12 is an illustration of an example of an apparatus for generating a triangle mesh in accordance with some embodiments of the invention.

FIG. 12 illustrates an example wherein an image transmitter 1201 is arranged to generate an image data stream which it transmits to an image receiver 1203. In the example, the image transmitter 1201 includes a depth map source 101 and an image source 103 which may correspond to those of FIG. 2. Similarly, the image transmitter 1201 includes a tree generator 105 corresponding to the one described for FIG. 2.

In addition, the image transmitter 1201 comprises an image stream generator 1205 which is arranged to generate an image data stream. In many embodiments, the image transmitter 1201 is arranged to generate a video stream comprising a sequence of images. The following description will consider an example wherein a video stream is generated and the references to a single image can be considered as references to one image of the sequence of images forming the video signal.

In the example, the image stream generator 1205 is arranged to include the image data from the image source 103 and the depth map from the depth map source 105 into the video stream but it will be appreciated that in some embodiments one or both of these may not be included in the video stream. In the example, a video stream is thus provided which may include a sequence of two dimensional images and associated depth maps.

In addition, the image stream generator 1205 is arranged to receive the k-D tree(s) from the tree generator 105 and to include this (these) in the video stream. Thus, the video stream may include the information of how the depth map(s) have been divided into regions of sufficiently homogenous regions.

The video data stream is transmitted to the image receiver 1203 where it is fed to a stream receiver 1207 which is arranged to extract the relevant data from the received video stream. The image receiver 1203 further comprises a triangle mesh generator 107 corresponding to the one described with reference to FIG. 2. The triangle mesh generator 107 is coupled to the stream receiver 1207 which specifically extracts the k-D tree and feeds it to the triangle mesh generator 107. The triangle mesh generator 107 further receives the depth maps and proceeds to generate the triangle mesh as previously described.

The image receiver 1203 thus generates a triangle mesh which can be output together with other relevant information that may be desired in the individual embodiment, such as the two dimensional images, the depth maps, texture images etc. The data may then be used in suitable post-processors and specifically the post processing can be based on a triangle mesh.

In the system, the functionality for generating a triangle mesh is thus distributed between an image transmitter 1201 and an image receiver 1203 with an image/video data stream transmitted by the two including a representation of the k-D tree.

This approach may provide an attractive solution in many embodiments. Indeed, it may provide an efficient coding of three dimensional information and provide an advantageous distribution of complexity and resource demand between a server side (the image transmitter 1201) and a client side (the image receiver 1203).

Further, the approach may allow a particularly advantageous approach where the three dimensional information is encoded as an image/video signal. Indeed, in some embodiments, the three dimensional information may be encoded using an image (video) encoding/decoding approach, i.e. instead of directly encoding the k-D tree using a dedicated encoding format, the information is encoded by the same video or image coding algorithm that is used for a normal two dimensional visual image. Thus, a video encoder and decoder may encode and decode the three dimensional information represented by the k-D tree by treating it as a normal image, and indeed typically without any knowledge of it being anything other than a normal image.

This approach has a number of advantages and specifically allows existing image/video encoders and decoders to be used. Indeed, the approach allows a distribution of relevant three dimensional information without requiring new formats or standards to be developed as it effectively can be communicated using existing video formats as "wrappers" in which the data can be provided.

The communication of the k-D tree is particularly suitable to this approach as this information can be represented by a simple two dimensional map with one data value for each pixel. Thus, in contrast to communicating a triangle mesh which is a direct three dimensional structure, the communication of the k-D tree, which can be represented by a two-dimensional map of values, can use the same approach and format as is applied to two-dimensional images.

Accordingly, in some embodiments, the image stream generator 1205 is arranged to apply an image (and specifically a color or luminance channel) encoding to the k-D tree and to include the resulting image encoded data in the image/video data stream.

For example, the image stream generator 1205 may be arranged to generate a video stream including one or more image signals encoded in accordance with a suitable video encoding standard. Video/image signals typically represent color images by a plurality of color channels (which may be pure chroma or pure luminance channels). For example, a widespread format is to represent a color image by a Red, Green and Blue color channel which is then encoded individually. Another example is to represent an image by a YUV format where Y is a luminance channel and U and V represent two color channels that in the specific example are pure chroma channels. Each of these channels contain a single two dimensional map of data values (representing a luma, chroma or chrominance value).

In some embodiments, the k-D tree may accordingly be represented by a two dimensional map of values. For example, for each pixel of the depth map, the k-D tree map may include a value which designates the size of the region to which the pixel belongs. This map may then be input to the video encoder as if it were a map for a color channel, and it will accordingly be encoded as if it were a (partial) representation of an image.

Similarly, the video decoder of the stream receiver 1207 will decode the map as if it were a map for a color channel (e.g. a pure luminance or chroma channel). The decoded data will then be output as a two dimensional map which can be fed to the triangle mesh generator 107 and used to generate the triangle mesh.

In some embodiments, the video encoder may thus receive an image to encode which includes the k-D tree map in one channel. In some embodiments, any other channels may be empty (e.g. all pixels may include dummy zero value). For example, the k-D tree may be encoded in the R-channel of an RGB signal with no data (or constant data values) being included in the G and B channels.

However, in other embodiments, other data may be included in the other channels.

Specifically, in some embodiments, the image transmitter 1201 may be arranged to combine the depth map and the k-D tree map into different channels (color/chroma/luminance channels) of the same pseudo image being encoded by the video encoder. Thus, the video encoder may be arranged to encode a video representation comprising a plurality of channels where the depth map may be included in a first channel and the k-D tree may be included in (at least) a second channel.

The image transmitter 1201 may generate a data structure corresponding to a color image. For example, a structure of three two dimensional data maps may be generated with each data map corresponding respectively to e.g. one of an R, G and B channel or to one of an Y, U and V channel. One of the data maps may then be populated by the data values from the depth map and one data map may be populated by data from the k-D tree map. The last data map may e.g. be populated by other data (e.g. a transparency map) or may be left empty (e.g. by all values being set to zero). The resulting data structure is then encoded by the video encoder, included in the video stream, extracted by the image receiver 1203, and decoded by the video decoder of the image receiver 1203 to recover the depth map and the k-D tree map.

In many embodiments, the video encoder may specifically be arranged to encode a video representation comprising a luminance channel and at least one chroma channel, and the image transmitter 1201 may be arranged to encode the depth map in the luminance channel and the k-D tree in at least one chroma channel. In many embodiments, it may be particularly advantageous to encode the depth map in the luminance channel and the k-D tree map in the chroma channel(s). Typically the depth map will tend to have a significantly higher variation in values than the k-D tree map. Indeed, for the k-D tree map, the data value is typically constant for each encoding block of pixels. In many video encoding standards, the encoding of the luminance channel may be more effective or accurate than for chroma channels and therefore it may be advantageous to apply this encoding to the map with the highest variation.

It will be appreciated that the resolution of all the maps need not be the same. For example, the resolution of the k-D tree map may often be lower than for the depth map. For example, if the smallest region that can be generated by the tree generator 105 is four pixels, the resolution of the k-D tree map may be a quarter of the resolution of the depth map.

It will also be appreciated that the resolution of the depth map and the k-D tree map may be different than the resolution of the two dimensional image provided by the image source 103. Indeed, as the depth map and k-D tree maps are encoded as a separate image (thus the video stream will include two image streams, one corresponding to the two dimensional image and one corresponding to the combined depth map and k-D tree map), the encoding need not impose any restrictions on the relationship between the image and maps.

In some embodiments, the k-D tree may be represented by a plurality of values. For example, the k-D tree may allow non-square rectangles and thus each region may be defined by a horizontal and vertical size. The k-D tree may be represented by two values being assigned to each pixel with one indicating a horizontal size and the other indicating a vertical size. These two values may in some embodiments be assigned to two different data maps, i.e. rather than a single k-D tree map, the image transmitter 1201 may generate two maps with one map providing the horizontal division and the other providing the vertical division. These two maps may then be encoded in different channels. For example, the depth map may be provided in a Y channel with the two k-D tree depth maps being provided in respectively the U and V channels.

Thus, in some embodiments, the video representation comprises at least two color channels and the image transmitter 1201 encodes vertical region information for the k-D tree in one color channel and horizontal region information for the k-D tree in another channel.

As a specific example, the approach may use a H.264 video encoding/decoding format. This format supports encoding and decoding of H.264 video with texture and depth being placed side-by-side in the video stream. However, in such an approach, the coding of a three dimensional triangle mesh in video data is not feasible. Although it is in principle possible to encode triangle mesh data separately, this results in significant difficulties and typically an inefficient coding. For example, a substantial problem arises from the need to accurately synchronize the video/image data with the triangle mesh data. This may be avoided by the encoding of the k-D tree described above.

Thus as a specific example, in some embodiments quadtrees $Q(i, j)$ or $Q_h(i, j)$ and $Q_v(i, j)$ may be represented in a video stream at a location where depth is placed using separate color channels (for instance the chroma channels). The quadtrees will then follow the (lossy) encoding and decoding steps of the (H.264 or H.265) video encoding/decoding.

It should be noted that whereas the video encoding may be lossy, the effect on the k-D tree information can typically be reduced to an acceptable or insignificant level. Further, as many of the data values are the same, a very effective encoding can be achieved.

In order to reduce the risk of the encoding and decoding introducing errors, it may in some embodiments be beneficial to encode a derived representation which seeks to use a subset of the possible data values that have as high a distance as possible For example, a mapping $L(\alpha)$ may be applied to generate the data for the k-D tree map. E.g. the value $\alpha$ may represent a power of two used to represent the square size of the individual region. For instance, we may use the formula:

$$L(\alpha) = \begin{cases} 32(8 - \alpha + 1) - 1 & \text{if } \alpha < 8 \\ 0 & \text{if } \alpha = 8 \end{cases}$$

to transform the quadtree to values that vary with a constant step of 32 levels through the total 8-bit range from 0 (region size of 256) to 255 (region size of 1) in steps of 32.

In some embodiments, the k-D tree may also be used for encoding of the three dimensional image, and specifically for encoding of one or more two dimensional images being part of the representation of the three dimensional image. Thus, the same k-D tree may be used both for an image/video encoding as well as for dividing the depth map such that a triangle mesh can be generated.

Indeed, in many embodiments, an image or video encoding may be performed which divides an image into sub-coding blocks. Indeed, whereas traditional video encoding formats have divided images into predetermined and fixed size image blocks (e.g. 16×16 pixels), newer approaches have been developed wherein a dynamic division of images into individual coding blocks is employed. In some such formats, a k-D tree may be used to generate coding blocks comprising blocks of pixels that are relatively similar and which accordingly can be coded effectively.

For example, the video encoding approach known as H.265 includes generating a quadtree where the resulting regions are then used as the coding blocks subsequently being encoded. This quadtree is known as a code block tree and is encoded in the image stream together with the encoded image data. A receiver/decoder may accordingly extract the code block tree from the received data stream and then input this to the decoder which uses it to decode the received image/video data.

In some embodiments such an image or video encoding/decoding k-D tree may also be used as the k-D tree for generating the triangle mesh.

Thus, at the decoder, the code block tree may be extracted and used to decode the received image data. In addition, the code block tree may be fed to the triangle mesh generator 107 which proceeds to use it to generate the triangle mesh as previously described.

The approach may thus utilize the same k-D tree for two very different things, namely for video encoding/decoding and for triangle mesh generation.

The approach may provide very efficient distribution of video data. Indeed, it may allow a decoder to generate a reliable triangle mesh without requiring any data overhead to be introduced as the relevant data is already included.

In some embodiments, the video signal may further include a flag indicating whether the code tree block included is suitable for generation of a triangle mesh or not. Thus, the signal may comprise an embedded flag/message to indicate that the code tree block has been generated with this purpose. This may allow the receiver to determine whether to use the coding tree block (see e.g. https://sonnati.wordpress.com/2014/06/20/h265-part-i-technical-overview) or to use a default/fall-back approach (such as generating a k-D tree locally).

Thus, in some embodiments the image transmitter 1201 may be arranged to encode image and depth using a code tree block (e.g. using H.265). The receiver may extract this code tree block and use it to generate the triangle mesh.

In the case of a more general rectangular division, the map may be generated to use a limited number of possible sizes that are mapped to levels that are separated as much as possible in order to mitigate the compression-decompression. In some embodiments, the encoding may instead be a lossless encoding.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality. Reference signs in the claims are provided merely as a clarifying example shall not be construed as limiting the scope of the claims in any way.

The invention claimed is:

1. An apparatus for generating a triangle mesh for a three dimensional image, the apparatus comprising:
    a depth map source circuit, wherein the depth map source circuit is arranged to provide a depth map, wherein the depth map comprises regions;
    a tree generator circuit, wherein the tree generator circuit is arranged to generate a k-D tree for the depth map, wherein the k-D tree represents a hierarchical arrangement of the regions, wherein the hierarchical arrangement of the regions satisfies a requirement that a depth variation measure for each of the regions is less than a threshold; and
    a triangle mesh generator circuit, wherein the mesh generator circuit is arranged to position an internal vertex within each of the regions of the k-D tree, wherein the triangle mesh generator circuit is arranged to generate the triangle mesh by forming sides of triangles of the triangle mesh as lines between internal vertices of neighboring regions, wherein internal vertices between adjacent regions are connected to each other using only one line segment.

2. The apparatus of claim 1, wherein the internal vertex for each of the regions is positioned centrally in each of the regions.

3. The apparatus of claim 1,
    wherein the triangle mesh generator circuit is arranged to form a triangle for each junction between three regions, and
    wherein the triangle has sides connecting the internal vertices of the three regions.

4. The apparatus of claim 1,
    wherein the triangle mesh generator is arranged to form a first triangle and a second triangle for each junction between four regions,
    wherein the first triangle and the second triangle have a common side connecting vertices of two diagonally opposite regions of the four regions,
    wherein the first triangle is formed by having sides connecting the vertices of the two diagonally opposite regions to an internal vertex of a third region of the four regions, and
    wherein the second triangle is formed by having sides connecting the internal vertices of the two diagonally opposite regions to an internal vertex of a fourth region of the four regions.

5. The apparatus of claim 1 wherein the k-D tree is a quadtree.

6. The apparatus of claim 1 wherein the tree generator is further arranged to divide the regions in response to a luminance or chroma property of the three dimensional image.

7. The apparatus of claim 1 wherein the tree generator is arranged to generate the k-D tree to have rectangular regions that are not constrained to be square regions.

8. The apparatus of claim 1 wherein the tree generator is arranged to divide a region subject to a constraint that each junction formed by three regions following the division include the junction.

9. The apparatus of claim 1,
wherein the tree generator is part of a transmitter circuit,
wherein the triangle mesh generator circuit is part of a receiver circuit,
wherein the transmitter circuit is arranged to generate an image data stream representing the three dimensional image and to encode the k-D tree in the image data stream, and
wherein the receiver circuit is arranged to extract the k-D tree from the image data stream and provide the k-D tree to the triangle mesh generator circuit.

10. The apparatus of claim 9,
wherein the transmitter circuit is arranged to apply an image encoding to the k-D tree to generate encoded k-D tree data, and
wherein the transmitter circuit is arranged to include the encoded k-D tree data in the image data stream.

11. The apparatus of claim 1, further comprising an image encoder,
wherein the image encoder is arranged to encode the three dimensional image, and
wherein the image encoder is arranged to encode the three dimensional image using the k-D tree.

12. A method of generating a triangle mesh for a three dimensional image, the method comprising:
providing a depth map comprising regions;
generating a k-D tree for the depth map, wherein the k-D tree represents a hierarchical arrangement of the regions, wherein the hierarchical arrangement of regions satisfies a requirement that a depth variation measure for each of the regions is less than a threshold;
positioning an internal vertex within each region of the k-D tree; and
generating the triangle mesh by forming sides of triangles of the triangle mesh as lines between internal vertices of neighboring regions, wherein internal vertices between adjacent regions are connected to each other using only one line segment.

13. The method of claim 12, wherein the internal vertex for each of the regions is positioned centrally in each of the regions.

14. The method of claim 12,
wherein the generating forms a triangle for each junction between three regions, and
wherein the triangle has sides connecting the internal vertices of the three regions.

15. The method of claim 12,
wherein the generating forms a first triangle and a second triangle for each junction between four regions,
wherein the first triangle and the second triangle have a common side connecting vertices of two diagonally opposite regions of the four regions,
wherein the first triangle is formed by having sides connecting the vertices of the two diagonally opposite regions to an internal vertex of a third region of the four regions, and
wherein the second triangle is formed by having sides connecting the internal vertices of the two diagonally opposite regions to an internal vertex of a fourth region of the four regions.

16. The method of claim 12, wherein the k-D tree is a quadtree.

17. The method of claim 12, wherein the generating divides the regions in response to a luminance or chroma property of the three dimensional image.

18. An apparatus for generating a triangle mesh, the apparatus comprising:
a receiver circuit arranged to receive a video signal, wherein the video signal comprises image data,
wherein the image data comprises a representation of a three dimensional image and a k-D tree for a depth map of the three dimensional image,
wherein the depth map comprises regions,
wherein the k-D tree represents a hierarchical arrangement of the regions, wherein the hierarchical arrangement of the regions satisfies a requirement that a depth variation measure for regions is than a threshold; and
a triangle mesh generator circuit arranged to position an internal vertex within each of the regions of the k-D tree, wherein the triangle mesh generator circuit is further arranged to generate the tringle mesh by forming sides of triangles of the triangle mesh as lines between internal vertices of neighboring regions, wherein internal vertices between adjacent regions are connected to each other using only one line segment.

19. The apparatus of claim 18, further comprising a decoder circuit,
wherein the decoder circuit is arranged to decode the three dimensional image from the image data, and
wherein the decoding is in response to the k-D tree.

20. The apparatus of claim 18, wherein the triangle mesh generator circuit is arranged to position the internal vertex within each of the regions of the k-D tree at a geometric center of each of the regions of the k-D tree.

* * * * *